O. M. YORK.
SHEEP FEEDING RACK.
APPLICATION FILED OCT. 21, 1918.
1,347,070.
Patented July 20, 1920.
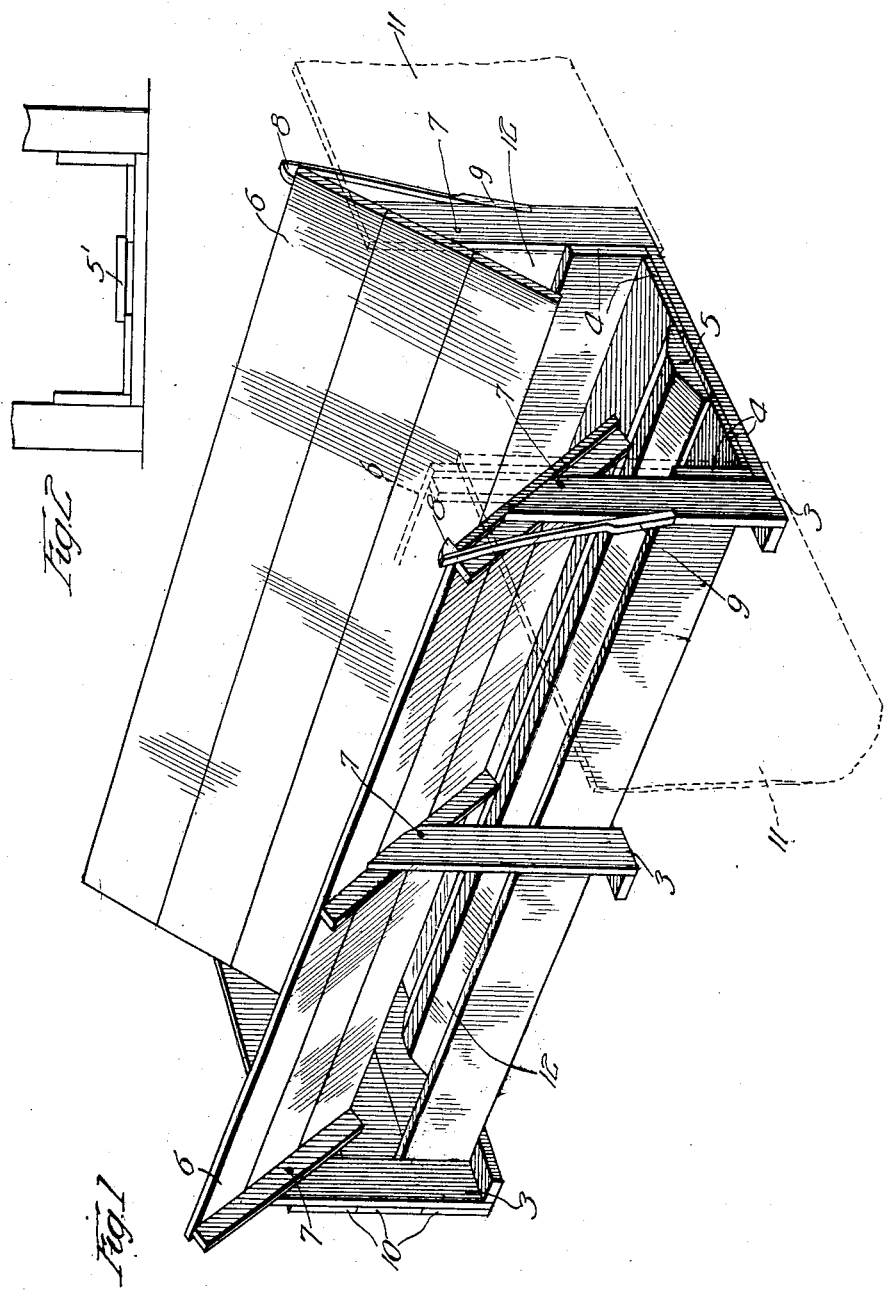
Witnesses:
Arthur M. Carlson
Robert H. Weir
Inventor
Oscar M. York
by Jabel + Mueller
Attys.

ated October 21, 1918.  Serial No. 258,963.

UNITED STATES PATENT OFFICE.

OSCAR M. YORK, OF MILLINGTON, MICHIGAN.

SHEEP-FEEDING RACK.

1,347,070.	Specification of Letters Patent.	Patented July 20, 1920.

Application filed October 21, 1918.  Serial No. 258,963.

*To all whom it may concern:*

Be it known that I, OSCAR M. YORK, a citizen of the United States, residing at Millington, in the county of Tuscola and State of Michigan, have invented a certain new and useful Improvement in Sheep-Feeding Racks, of which the following is a full, clear, concise, and exact description, reference being had to the accompanying drawings, forming a part of this specification.

My invention relates to feeding racks and has to do more particularly with racks adapted principally for feeding sheep. In the preferred form of my invention a trough-like structure is provided having pivoted wings or side boards along one or both sides of the trough and so arranged that the bottoms of the wings are swung inwardly to provide an opening alongside of the trough through which the sheep may feed, the top of the wings being adapted to swing outwardly so as to form an inclined support for the feed or forage and at the same time act as a protection to prevent the sheep from pulling the forage down upon their backs and into their wool. Furthermore it permits of the placing of the grain or forage or both in the rack so that the sheep may reach for it at any time. A further advantage of my invention is that it reduces the ordinary waste of feed, as it all will drop into the trough where it may be readily reached by the sheep. It also permits the feeder to feed the sheep without going among them. A further feature of my invention is that it may be readily closed and access to the trough had for cleaning purposes.

Referring now to the accompanying drawing which illustrates the preferred embodiment of my invention—

Figure 1 is a perspective view of my improved feeding rack.

Fig. 2 is an end view of a rack showing a flat divider board.

My invention comprises a trough-like structure preferably of wood and including a number of U-shaped frames 3 suitably inclosed with bottom and side boards 4 so as to form the bottom part of the trough. A central longitudinally disposed divider-board 5 is also provided for conducting the grain and forage to the sides of the trough where it may be readily reached by the stock. I also provide swinging wings or side boards 6, pivotally attached at 7 to the various uprights of the frames 3, these wings or side boards being arranged to be tilted into an open or feeding position as shown in the drawing where they are held by spring catches 8, preferably of wood and suitably attached at 9 to the uprights of the frames. One end of the rack is shown closed by means of boards 10, the other end of the rack being open so that ready access thereto may be had for throwing in the feed and cleaning out the trough. I also find it very desirable to arrange the rack along a feed alley 11 indicated in dotted lines, the alley having doors or openings opposite each of the racks, as shown. Thus the feeder may walk along the alley for the purpose of throwing feed into the rack without going among the sheep, or for cleaning out the trough.

As shown in the drawing, the rack is in its open or feeding position with the wings or side boards tilted so as to provide the feed opening 12 through which the stock may reach the grain or forage which is supported between the inclined surfaces of the wings which act to slowly feed the forage as it is consumed. Furthermore the inclined wings or side boards 6 act as a protection to the sheep's backs, making it impossible for them to pull the forage down into their wool. Also by using a divider-board as 5 the feed is more readily conducted to the sides of the trough making it easier for the stock to reach it so that they do not rub the wool off the back of their necks.

When the rack is to be closed, the spring catches 8 are simply pressed back clear of the wings 6 and they are then permitted to drop into their vertical or closed position as indicated by the dotted lines. The feeder may then enter the rack from the feed alley through the open end for the purpose of cleaning it out.

In Fig. 1, I have shown the divider-board 5 as being triangular in shape but it is to be understood that a flat board as 5' of Fig. 2 may be used if desired.

It will thus be apparent that with my improved construction I provide a rack that permits of the placing of grain or forage or both in the rack so that it is accessible to the stock so long as the wings or side boards are maintained in their open or feeding position, and it reduces to a minimum the waste of feed; also in which it is impossible for the sheep to pull the forage down upon their backs and into their wool; it furthermore conducts the feed to sides of the trough where it may be readily reached so that the sheep do not rub the wool from the back of their necks; and furthermore permits of placing the racks along the feed alley so that access to the rack may be readily had therefrom without going among the sheep.

For the purpose of illustrating my invention I have shown the preferred form but it is to be understood that I contemplate using my invention in other ways than that shown and therefore I do not desire to be limited to the exact structure as shown and described but aim to cover all that which comes within the spirit and scope of the appended claims.

I claim:—

1. A feeding rack of the character described comprising a U-shaped frame work having a floor and side boards to form feed troughs along each side, wings centrally pivotally supported on the top of the frame so as to close the sides of the rack and feed troughs when in vertical position, said wings being movable inwardly at their bottoms from the inside or one end of the rack to provide feeding openings, and means engaging the upper edges of the wings for holding them in such latter position.

2. A sheep feeding rack comprising a central feed trough, vertically disposed centrally pivoted tiltable side-boards along each side of the trough whereby the lower portions may swing directly inwardly and the upper portions directly outwardly by pressure applied to the top of the side-boards so as to provide a converging feed support wider at the top than the normally closed width of the side-boards with feed openings along the bottom, and locks for holding the side-boards when so pressed outwardly and operable from inside the trough to release the side-boards whereby they automatically restore to a vertical position and completely close the feed openings.

In witness whereof, I hereunto subscribe my name this fourth day of October A. D., 1918.

OSCAR M. YORK.